C. Saxton,
Gate.

No. 98,194. Patented Dec. 21. 1869

Witnesses
F. Lehmann
C. L. Evert

Inventor
Chas. Saxton
per Alexander Mason
Attys.

United States Patent Office.

CHARLES SAXTON, OF FREDONIA, OHIO.

Letters Patent No. 98,194, dated December 21, 1869.

IMPROVEMENT IN GATES.

The Schedule referred to in these Letters Patent and making part of the same.

*To all whom it may concern:*

Be it known that I, CHARLES SAXTON, of Fredonia, in the county of Licking, and in the State of Ohio, have invented certain new and useful Improvements in Gates; and do hereby declare that the following is a full, clear, and exact description thereof, reference being had to the accompanying drawings, and to the letters of reference marked thereon, making a part of this specification.

The nature of my invention consists in the construction and arrangement of a gate sliding upon rollers, as will be hereinafter fully set forth.

In order to enable others skilled in the art to which my invention appertains, to make and use the same, I will now proceed to describe its construction and operation, referring to the annexed drawings, in which—

A and $A^1$ represent the gate-posts, placed any desired distance apart.

On a line with these posts is placed another post, $A^2$, a suitable distance from the post $A^1$.

Figure 1:
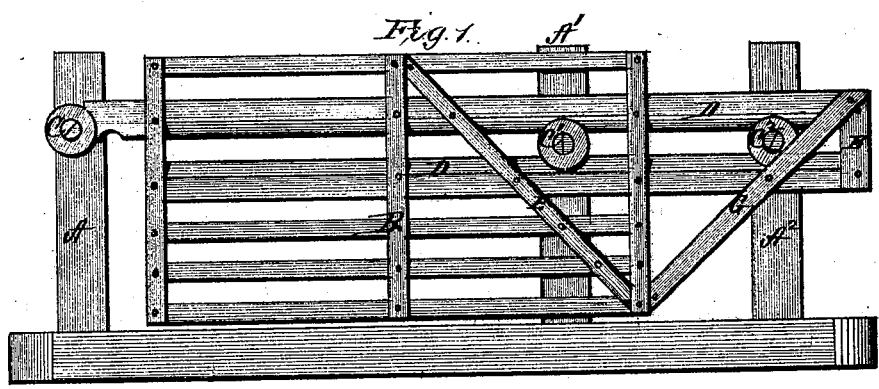
Figure 1 is a front view of the entire gate.
Figure 2:
Figure 2 is a side view of one of the bevelled rollers.

On each of these three posts, at the same distance from the ground, is pivoted a roller; the one, C, on the gate-post A, being a common flanged roller, with the flange on the outer end, while the other two, $C^1$ and $C^2$, placed respectively on the posts $A^1$ and $A^2$, have a flange on the outer end, which is bevelled inward toward the centre, as shown in fig. 2.

The gate B is made in any of the known and usual ways, of suitable size to close the aperture between the gate-posts A and $A^1$.

On the inner side of the gate B are placed two parallel bars, D, which are bevelled on their inner edges, so that when placed on the rollers $C^1$ and $C^2$ they will fit the bevelled flanges on the same.

The bars D D extend at the rear end of the gate far enough to embrace the roller $C^2$, when the gate is closed, and at this end the bars D D are connected or closed by a cross-bar, E, and also braced to the gate by the brace G.

At the front end of the gate the upper one of the bars D extends a suitable distance, and is notched at its lower edge, so as to catch on the flanged roller C, and hold the gate closed.

Having thus fully described my invention,

What I claim as new, and desire to secure by Letters Patent, is—

The arrangement, upon a gate, of the bevelled parallel bars D D, cross-bar E, brace G, and bevelled and flanged rollers $C^1 C^2$, substantially as shown and described.

In testimony that I claim the foregoing, I have hereunto set my hand, this 28th day of September, 1869.

CHARLES SAXTON.

Witnesses:
 ASBURY B. BARRICK,
 CHAS. FOLLETT.